US010394770B2

(12) United States Patent
Asher et al.

(10) Patent No.: US 10,394,770 B2
(45) Date of Patent: Aug. 27, 2019

(54) METHODS AND SYSTEMS FOR IMPLEMENTING A DATA RECONCILIATION FRAMEWORK (71) Applicant: GENERAL ELECTRIC COMPANY, Schenectady, NY (US)

(72) Inventors: Isaac Mendel Asher, Saratoga Springs, NY (US); Albert Rosario Cerrone, Saratoga Springs, NY (US); You Ling, Schenectady, NY (US); Ankur Srivastava, Albany, NY (US); Arun Karthi Subramaniyan, Clifton Park, NY (US); Felipe Viana, Niskayuna, NY (US); Liping Wang, Mechanicville, NY (US); Natarajan Chennimalai Kumar, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 173 days.

(21) Appl. No.: 15/395,421

(22) Filed: Dec. 30, 2016

(65) Prior Publication Data
US 2018/0189332 A1 Jul. 5, 2018

(51) Int. Cl.
G06F 17/30 (2006.01)
G06F 7/00 (2006.01)
G06F 16/215 (2019.01)
G06N 5/02 (2006.01)

(52) U.S. Cl.
CPC ........... *G06F 16/215* (2019.01); *G06N 5/022* (2013.01)

(58) Field of Classification Search
CPC .................... G06N 5/022; G06F 17/30303

USPC .......................................................... 707/690
See application file for complete search history.

(56) References Cited

U.S. PATENT DOCUMENTS

| 6,278,913 | B1 | 8/2001 | Jiang |
| 8,266,066 | B1 | 9/2012 | Wezter et al. |
| 8,670,893 | B2 | 3/2014 | Geddam et al. |
| 9,026,336 | B2 | 5/2015 | Ziarno |
| 9,376,983 | B2 | 6/2016 | Moeckly et al. |

(Continued)

OTHER PUBLICATIONS

Guo et al., "Flight Data Visualization for Simulation Evaluation: A General Framework", Computational Intelligence and Design (ISCID), 2012 Fifth International Symposium on, pp. 497-502, Oct. 28-29, 2012.

(Continued)

*Primary Examiner* — Kuen S Lu
(74) *Attorney, Agent, or Firm* — Buckley, Maschoff & Talwalkar, LLC (57) ABSTRACT Some aspects are directed to data reconciliation frameworks. An example framework is configured to receive core data, the system model comprising a plurality of data records associated with at least two assets, receive a system model, the system model comprising context data indicating, execute a configuration operation of a data validation process based on the system model, execute the data validation process to identify at least one inconsistent or incomplete record among the plurality of data records, determine at least one data reconciliation technique from a plurality of data reconciliation techniques based on the system model, and apply the at least one data reconciliation technique to the core data to reconcile the at least one inconsistent or incomplete record.

20 Claims, 7 Drawing Sheets (56) References Cited

U.S. PATENT DOCUMENTS

| | | | | |
|---|---|---|---|---|
| 2004/0083199 A1* | 4/2004 | Govindugari | ..... | G06F 17/30303 |
| 2004/0111302 A1* | 6/2004 | Falk | ....................... | G06Q 10/10 |
| | | | | 705/4 |
| 2007/0288272 A1* | 12/2007 | Marks | .................... | G06Q 10/10 |
| | | | | 705/4 |
| 2014/0172301 A1 | 6/2014 | Navarro et al. | | |
| 2015/0324501 A1 | 11/2015 | Desell et al. | | |
| 2016/0083118 A1 | 3/2016 | Mahalingaiah et al. | | |
| 2017/0336288 A1* | 11/2017 | Schwarz | ................ | B64D 27/10 |

OTHER PUBLICATIONS

Hufner et al., "A customized design framework for the model-based development of engine control systems", Industrial Electronics Society, IECON 2013—39th Annual Conference of the IEEE, pp. 6916-6921, Nov. 10-13, 2013.

Samuel Hidalgo, "Diagnostics and engine management/numeric database", 2007 IEEE Autotestcon, pp. 462-468, Sep. 17-20, 2007.

\* cited by examiner

METHODS AND SYSTEMS FOR IMPLEMENTING A DATA RECONCILIATION FRAMEWORK

BACKGROUND

Industrial equipment or assets, generally, are engineered to perform particular tasks as part of a business process. For example, industrial assets can include, among other things and without limitation, manufacturing equipment on a production line, wind turbines that generate electricity on a wind farm, healthcare or imaging devices (e.g., X-ray or MRI systems) for use in patient care facilities, or drilling equipment for use in mining operations. The design and implementation of these assets often considers both the physics of the task at hand, as well as the environment in which such assets are configured to operate.

Low-level software and hardware-based controllers have long been used to drive industrial assets. However, the rise of inexpensive cloud computing, increasing sensor capabilities, and decreasing sensor costs, as well as the proliferation of mobile technologies have created opportunities for creating novel industrial assets with improved sensing technology that are capable of transmitting data that can then be transmitted to a network.

By transmitting locally acquired sensor and environment data to a computing infrastructure, this data may be processed and analyzed to measure and predict the behavior of the underlying assets. Predictive models can assist with determining the likelihood of particular outcomes based on sensor data received from the asset, past performance of the same or similar assets, predicted future performance of the same or similar assets, and the like.

However, predictive models are only useful in scenarios when they receive good input data. Models receiving faulty or incomplete data are likely to provide erroneous or incomplete results. Even worse, some predictive model authoring techniques use machine learning to "train" models that are subsequently used to predict outcomes. If the data used to train these models is incomplete or incorrect, the resulting predictive models are also likely to provide incorrect results, even if the data later provided as input is correct.

Recognizing these and other problems with the implementation of frameworks for authoring and utilizing predictive models, the inventors have developed methods and systems for reviewing, reconciling, reconstructing, estimating, and imputing data from received data records. It would therefore be desirable to provide a framework for authoring and/or executing predictive models that provides the capability to detect cases where data records are incomplete or inconsistent and estimate or impute data to correct the missing or inconsistent data.

SUMMARY

Some embodiments generally relate to methods and systems for implementing a data recovery framework. Embodiments include systems and methods for detecting inconsistent and/or incomplete data records and imputing, correcting, and/or estimating data to address those inconsistent and/or incomplete data records (collectively, "reconciling" those data records). Embodiments also provide a computing framework whereby the process of detecting inconsistent and erroneous records and reconciling those records is configurable for use with arbitrary data sources.

An embodiment includes a computer system implementing a data reconciliation framework. The computer system is configured to receive core data, the system model comprising a plurality of data records associated with at least two assets, receive a system model, the system model comprising context data indicating at least one characteristic of the at least two assets, execute a configuration operation of a data validation process based on the system model, wherein the configuration operation comprises selecting at least one heuristic based on the at least one characteristic, execute the data validation process to identify at least one inconsistent or incomplete record among the plurality of data records, determine at least one data reconciliation technique from a plurality of data reconciliation techniques based on the system model, and apply the at least one data reconciliation technique to the core data to reconcile the at least one inconsistent or incomplete record.

The core data may include repair maintenance data (RMD) for a plurality of aircraft engines, the system model may include information identifying a relationship between the plurality of aircraft engines, one or more flights, and one or more aircraft, and the data validation process may identify the at least one inconsistent or incomplete record based on determining that the core data is missing at least one entry for at least one of the one or more flights.

The system model may include data configuring at least one external data access process, and the data validation process may include retrieving external data from at least one external datastore according to the data configuring the at least one external data access process. The computer system may be further configured to determine whether at least one of the plurality of data records corresponds to the external data from the at least one external datastore as part of the data validation process. The external data may be airport flight information. The context data may include system context data, and the at least one characteristic may indicate a grouping of assets among the plurality of assets. The grouping may indicate a hierarchical relationship. The grouping may be a grouping by aircraft and the assets may be aircraft engines. The context data may include asset context data, and the at least one characteristic may be associated with a particular asset type of the at least two assets.

An embodiment includes a method for implementing a data reconciliation framework. The method includes receiving core data, the system model comprising a plurality of data records associated with at least two assets, receiving a system model, the system model comprising context data indicating at least one characteristic of the at least two assets, executing a configuration operation of a data validation process based on the system model, wherein the configuration operation comprises selecting at least one heuristic based on the at least one characteristic, executing the data validation process to identify at least one inconsistent or incomplete record among the plurality of data records, determining at least one data reconciliation technique from a plurality of data reconciliation techniques based on the system model, and applying the at least one data reconciliation technique to the core data to reconcile the at least one inconsistent or incomplete record.

The core data may include repair maintenance data (RMD) for a plurality of aircraft engines, the system model may include information identifying a relationship between the plurality of aircraft engines, one or more flights, and one or more aircraft, and the data validation process may identify the at least one inconsistent or incomplete record based on determining that the core data is missing at least one entry for at least one of the one or more flights. The system model may include data configuring at least one external data access process, and the data validation process may include retrieving external data from at least one external datastore according to the data configuring the at least one external data access process. The method may include determining whether at least one of the plurality of data records corresponds to the external data from the at least one external datastore as part of the data validation process. The external data may be airport flight information. The context data may include system context data, and the at least one characteristic may indicate a grouping of assets among the plurality of assets. The grouping may indicate a hierarchical relationship. The grouping may be a grouping by aircraft and the assets may be aircraft engines. The context data may include asset context data, and the at least one characteristic may be associated with a particular asset type of the at least two assets.

An embodiment includes a non-transitory computer readable storage medium comprising program instructions for implementing a data reconciliation framework, the instructions, when executed by a processor, cause the processor to receive core data, the system model comprising a plurality of data records associated with at least two assets, receive a system model, the system model comprising context data indicating at least one characteristic of the at least two assets, execute a configuration operation of a data validation process based on the system model, wherein the configuration operation comprises selecting at least one heuristic based on the at least one characteristic, execute the data validation process to identify at least one inconsistent or incomplete record among the plurality of data records, determine at least one data reconciliation technique from a plurality of data reconciliation techniques based on the system model, and apply the at least one data reconciliation technique to the core data to reconcile the at least one inconsistent or incomplete record. The core data may include repair maintenance data (RMD) for a plurality of aircraft engines, the system model may include information identifying a relationship between the plurality of aircraft engines, one or more flights, and one or more aircraft, and the data validation process may identify the at least one inconsistent or incomplete record based on determining that the core data is missing at least one entry for at least one of the one or more flights.

DETAILED DESCRIPTION

Overview and Definitions

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Gathering data from industrial assets provides unique challenges in some settings. Faulty sensors or data storage techniques may result in lost or inaccurate data. Further exacerbating these problems, assets may not be able to report data in real-time, so problems with data gathering operations may not be noticed for some time. As a particular example, aircraft engine sensor data is typically gathered when maintenance operations are performed. If a sensor fails, then no useful data may be gathered until the next maintenance operation when the failure is discovered. Additionally, in many scenarios involving legacy assets, data gathering operations are performed manually by technicians during maintenance operations.

A failure to gather the data by a technician or an inadvertent erasure of a storage medium may result in lost data records.

The inventors have recognized that the problems of ensuring complete and accurate data pose significant obstacles to the use of analytics in industrial settings. If inaccurate data is used to train analytics or to predict outcomes, it is likely inaccurate results will be received. The accuracy of such analytics is paramount, as inaccurate models cannot be relied upon to enable control and configuration of assets in an industrial setting.

The inventors have also recognized that, in many cases, it is possible to estimate or impute data for missing or inconsistent records using external data sources. However, the configuration of systems to access and utilize this external data requires a knowledge of the particular structures underlying the external data and the processing techniques necessary to use that external data to reconcile so-called "core" data received from assets. Recognizing these problems and other problems related to the ingestion of inaccurate or incomplete data, the inventors have developed a framework that is capable of reconciling core data records in a flexible, configurable manner that automatically implements algorithms for data reconciliation based on external data sources and reconciliation techniques configured by a user.

As used herein, the term "reconciliation" should be understood to refer to processing of received data records to address inaccurate or incomplete data. The act of reconciliation includes imputing missing data records and/or removing inconsistent or duplicative data records. Reconciliation of data records may also include estimation of data records for assets from which data has not yet been received (e.g., where an asset is part of a simulation or where a data storage device associated with the asset has not yet been accessed).

As used herein, the term "core data" refers to data related to a particular asset which is ingested by an analytic for training and/or prediction of an outcome. The techniques described herein relate to the estimation or imputation of records of this core data from a set of raw sensor data received from the asset or related to that asset.

As used herein, the term "external data" refers to data other than the core data that is used to impute or estimate aspects of the core data.

As used herein, the terms "context" and "context data" refer to data that indicates a set of rules and/or heuristics for detecting incomplete or inconsistent records within a set of core data. Context data may exist within an asset or asset class (e.g., an asset of a given type should conform to these rules), or for the asset as it exists within a larger ecosystem (e.g., assets are grouped in this particular manner, such as an aircraft having a particular number of engines). In the present application, the term "asset context data" should be understood to refer to context data about the asset itself, while the term "system context data" should be understood to refer to context data pertaining to the larger system in which the asset operates. System context data may include both data pertaining to physical characteristics of the asset and associated systems (e.g., number of engines on an aircraft) and context data associated with particular parties and external organizations (e.g., this airline only flies between these particular cities).

As used herein, the term "analytic" refers to computer code that, when executed, receives a set of input data and applies statistical analysis and/or machine learning modeling techniques to that set of input data to generate a result. This computer code may be generated as a result of the application of a training set of data to a particular statistical or machine learning technique.

For the purposes of this disclosure, an analytic that is paired to a particular industrial asset is referred to as a "digital twin" of that asset. A given digital twin may employ multiple analytics associated with multiple components or subcomponents of the asset. In some scenarios, a digital twin of a particular asset may include multiple analytics for predicting different behaviors or outcomes for that asset based on different sets of sensor data received from the asset or from other sources. An analytic or set of analytics associated with a particular industrial asset may be referred to as "twinned" to that asset.

A twinned asset may be either operating or non-operating. When non-operating, the digital twin may remain operational and its sensors may keep measuring their assigned parameters. In this way, a digital twin may still make accurate assessments and predictions even when the twinned physical system is altered or damaged in a non-operational state. Note that if the digital twin and its sensors were also non-operational, the digital twin might be unaware of significant events of interest.

A digital twin may be placed on a twinned physical system and run autonomously or globally with a connection to external resources using the Internet of Things (IoT) or other data services. Note that an instantiation of the digital twin's software could take place at multiple locations. A digital twin's software could reside near the asset and be used to help control the operation of the asset. Another location might be at a plant or farm level, where system level digital twin models may be used to help determine optimal operating conditions for a desired outcome, such as minimum fuel usage to achieve a desired power output of a power plant. In addition, a digital twin's software could reside in the cloud, implemented on a server remote from the asset. The advantages of such a location might include scalable computing resources to solve computationally intensive calculations required to converge a digital twin model producing an output vector y.

It should be noted that multiple but different digital twin models for a specific asset, such as a gas turbine, could reside at all three of these types of locations. Each location might, for example, be able to gather different data, which may allow for better observation of the asset states and hence determination of the tuning parameters, a, especially when the different digital twin models exchange information.

A "Per Asset" digital twin may be associated with an analytic for a particular twinned physical system. The mathematical form of the analytic underlying similar assets may, according to some embodiments, be altered from like asset system to like asset system to match the particular configuration or mode of incorporation of each asset system. A Per Asset digital twin may comprise a model of the structural components, their physical functions, and/or their interactions. A Per Asset digital twin might receive sensor data from sensors that report on the health and stability of a system, environmental conditions, and/or the system's response and state in response to commands issued to the system. A Per Asset digital twin may also track and perform calculations associated with estimating a system's remaining useful life.

A Per Asset digital twin may comprise a mathematical representation or model along with a set of tuned parameters that describe the current state of the asset. This is often done with a kernel-model framework, where a kernel represents the baseline physics of operation or phenomenon of interest pertaining to the asset. The kernel has a general form of:

$$\bar{y}=f(\bar{a},\bar{x})$$

where $\bar{a}$ is a vector containing a set of model tuning parameters that are specific to the asset and its current state. Examples may include component efficiencies in different sections of an aircraft engine or gas turbine. The vector x contains the kernel inputs, such as operating conditions (fuel flow, altitude, ambient temperature, pressure, etc.). Finally, the vector $\bar{y}$ is the kernel outputs which could include sensor measurement estimates or asset states (part life damage states, etc.).

When a kernel is tuned to a specific asset, the vector $\bar{a}$ is determined, and the result is called the Per Asset digital twin model. The vector $\bar{a}$ will be different for each asset and will change over its operational life. The Component Dimensional Value table ("CDV") may record the vector $\bar{a}$. It may be advantageous to keep all computed vector $\bar{a}$'s versus time to then perform trending analyses or anomaly detection.

A Per Asset digital twin may be configured to function as a continually tuned digital twin, a digital twin that is continually updated as its twinned physical system is in operation, an economic operations digital twin used to create demonstrable business value, an adaptable digital twin that is designed to adapt to new scenarios and new system configurations and may be transferred to another system or class of systems, and/or one of a plurality of interacting digital twins that are scalable over an asset class and may be broadened to not only model a twinned physical system but also provide control over the asset.

Embodiment of a System Implementing a Data Reconciliation Framework

Figure 1:
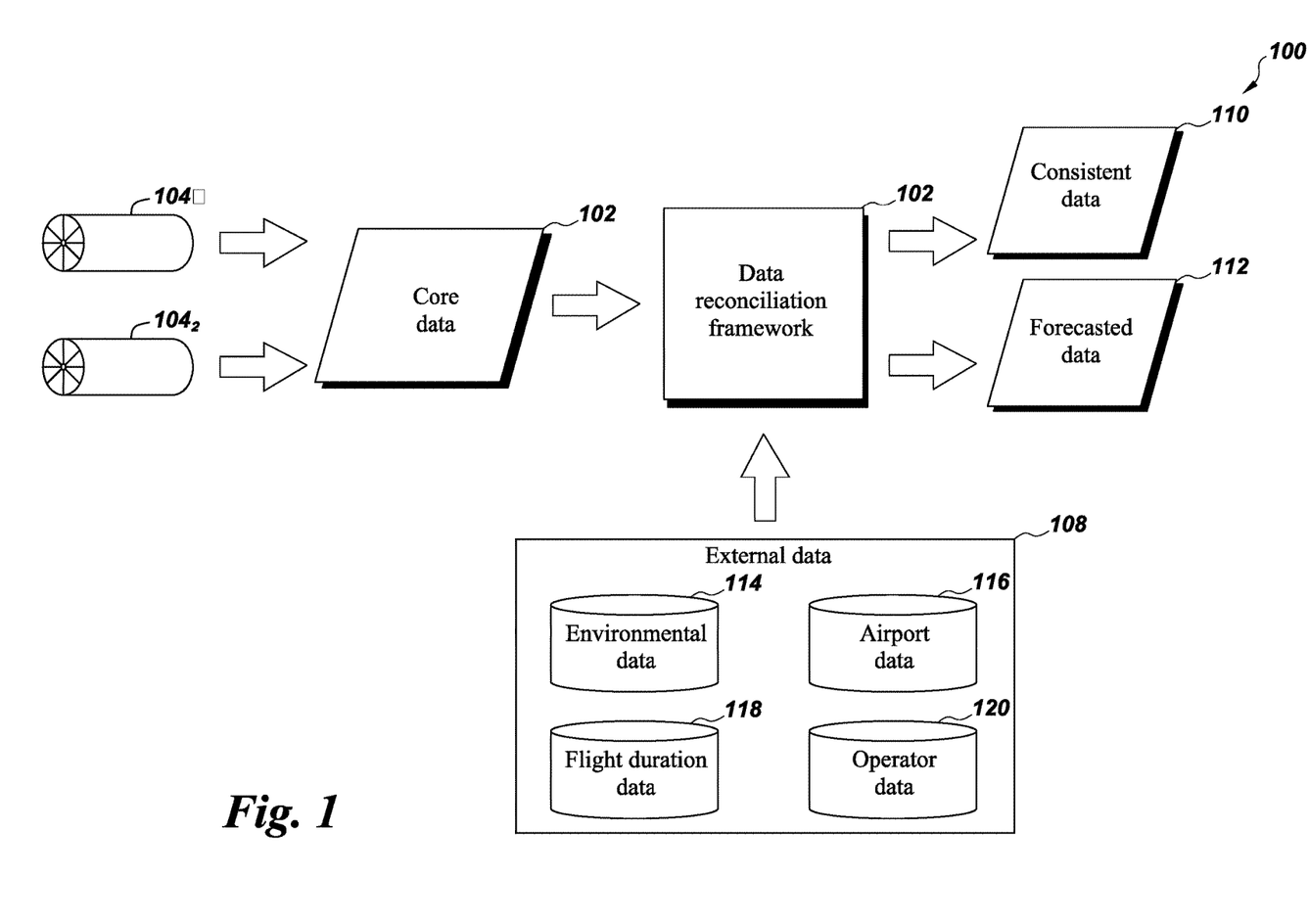
FIG. 1 depicts a system diagram of a framework for reconciling data records in communication with assets and external data sources in accordance with some embodiments.

FIG. 1 is a high-level architecture of a system 100 for implementing a data reconciliation framework in accordance with some embodiments. The system 100 provides for improved functionality of analytics by ensuring that the source data used to train those analytics and/or ingested by those analytics is consistent and accurate. To this end, the system 100 provides a data reconciliation framework 102 that is capable of receiving core data 106 from one or more assets 104, and using external data 108 to generate consistent data 110 and/or forecasted data 112.

The system 100 may be implemented on various types of computing hardware as known in the art. For example, in some embodiments the system may be implemented in a "cloud" infrastructure as part of a data analysis framework executing in a data center environment. For example, some or all components of the system 100 may be implemented by the Predix™ platform offered by General Electric company. In other embodiments, some or all components of the system 100 may be implemented on a local computer or as a series of computers in network communication with one another.

The system 100 receives core data 106 from a set of assets 104. The assets 104 may be any asset capable of providing core data for use with analytics. These assets 104 may include, but are not limited to, aircraft engines, locomotive engines, medical imaging devices, power plant generators, oil wells, and parts and components thereof, though it should be appreciated that any physical device capable of providing data for use in analytics could also be used as an asset within the architecture. In some embodiments, an asset 104 may be a disparate set of components or sensors. For example, embodiments may serve to gather data about a manufacturing process based on sensors on several different devices involved in the process, such that the "asset" in that case is the manufacturing process itself.

The core data 106 includes various sensor readings from the assets 104 or related to the assets 104. The core data 106 may include data organized in a particular manner. For example, in some embodiments the core data 106 represents sensor readings from an aircraft engine related to the usage cycles of that engine during flights (e.g., revolutions per minute and the like). In such an example, the core data 106 may also include an aircraft tail number on which the engine is mounted. The sensor readings may be organized by particular phases of flight, such as takeoff, climbing, cruising, descending, and landing.

The core data 106 may be missing certain records related to the assets 104 for various reasons. For example, a given aircraft engine may be missing flight data for a particular leg of a flight or a particular flight. To reconstruct this data, the core data 106 is forwarded to a data reconciliation framework 102. The data reconciliation framework 102 is configured to receive the core data 106 and external data 108, determine whether records are missing from the core data 106 by examining the core data 106 for internal inconsistencies and by analyzing the core data 106 in view of the external data 108. The data reconciliation framework 102 generates a set of consistent data 110 that includes imputed or estimated data for the identified missing records.

The external data 108 includes various forms of data that may be employed by the data reconciliation framework 102 to assist with reconciling the core data 106. As a particular example, in the scenario where the asset 104 is an aircraft engine, the external data 108 may include, for example, environmental data 114, airport data 116, a flight duration model 118, and flight count data 120. The environmental data 114 may include, for example, data about an environment at a particular location, such as dust levels in the air or a local temperature. The airport data 116 may include, for example, data about aircraft tail numbers that landed or took off from a particular airport, as received from that airport. The flight data 118 may be a database storing data collected from an aircraft or other physical component associated with the asset 104 (e.g., flight data recorder data). The operator data 120 may be a database maintained by an external partner, such as an airline, that includes a flight count for a particular engine or a particular aircraft tail number.

In some embodiments, the data reconciliation framework 102 may also use the core data 106 to forecast, estimate, and or simulate data for assets for which no core data is available. This data may be produced by the data reconciliation framework 102 as forecasted data 112.

To this end, the data reconciliation framework 102 provides a mechanism for generating a system model that configures the framework to reconcile arbitrary structures of core data 106 with arbitrary sets of external data 108. Detailed examples of the process by which the data reconciliation framework 102 performs these reconciliation functions are described below with respect to FIGS. 2-4 and 6.

Embodiment of a Data Reconciliation Framework

Figure 2:
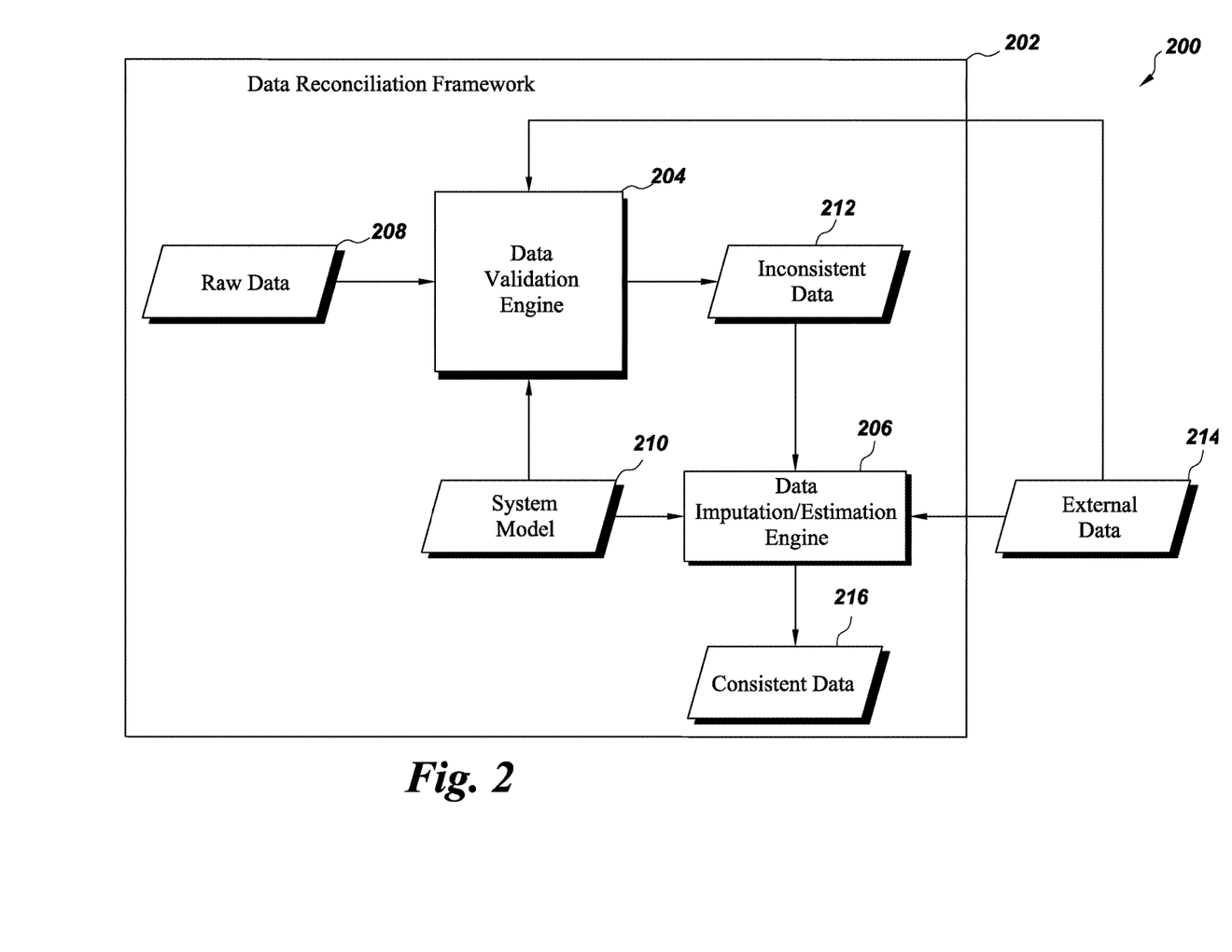
FIG. 2 depicts a detailed illustration of a data processing framework in accordance with some embodiments.

FIG. 2. illustrates a logical data view of a data reconciliation framework 200 in accordance with some embodiments. The data reconciliation framework 200 generates consistent data 216 from a set of raw core data 208. The raw data 208 may be data received from or pertaining to one or more assets as described above with respect to FIG. 1. The raw data 208 is provided to a data validation engine 204. The data validation engine 204 is configured by a system model 210 to identify inaccuracies, inconsistencies, and missing records within the raw data 208. To perform these functions, the data validation engine 204 may access a set of external data 214 as configured by the system model 210. For example, the system model 210 may include various heuristics for examining the raw data 208 to determine whether and when a record is invalid or missing information.

As a particular example, the system model 210 may include a hierarchical representation of the relationships between particular assets, along with identification of the form and structure of the core data, and external data sources and/or analysis techniques that may be used to fill in particular missing or inconsistent records within the core data. In the context of an aircraft engine, a set of core data 208 may specify a set of operational data for the engine (collectively referred to as maintenance-repair data (MRD)) that indicates various operational characteristics of the engine (e.g., time intervals, revolutions per minute, fuel consumption, and the like). The set of core data 208 may also include information about the asset that is not directly related to MRD, such as the tail number of the aircraft on which the engine is mounted, information on flights associated with the engine, and the like.

The system model 210 may provide metadata about the expected structure of a set of engine data, a set of flight data, and the like. For example, the system model 210 may indicate that a given set of engine data should have an identifier for a particular interval of a flight (e.g., takeoff, climb, cruise), and that each interval should have an associated set of MRD. The system model 210 may further indicate that each flight should have a particular set of intervals, such as a takeoff interval, a climbing interval, a cruise interval, and a landing interval. The system model 210 may further indicate relationships between engines on particular aircraft, such as "each aircraft has four engines." The data validation engine 204 ingests the raw data 208 and uses these relationships to identify gaps or inconsistencies in the set of raw data 208. For example, the data validation engine 204 may map engines with the same aircraft tail number to a data structure for that aircraft, and identify all flights taken by that aircraft. If the aircraft is a four-engine aircraft, but a given flight only includes MRD for three engines, then the data validation engine would note an inconsistency. Based on the enumerated characteristics and relationships specified within the system model, the data validation engine 204 is programmable to employ the system model to identify any gaps or inconsistencies.

In some embodiments, the system model 210 is provided according to a particular predefined set of configuration parameters. In this regard, the system model 210 may be provided in a particular format suitable for ingestion by the data reconciliation framework 200. The system model 210 may include certain templates or language constructs, such as the use of Boolean operators, triple stores, or the like to define the manner in which elements of the system and external data sources are in communication with one another. Embodiments may provide various authoring tools and integrated development environments to enable users to create these system models and configure the data reconciliation framework 200.

In some embodiments, the data validation engine 204 may also leverage the ability to interact with the external data 214 to identify inconsistencies within the raw data 208. For example, in some embodiments the external data 214 includes a set of airport data indicating flights that took off or landed at the particular airport. In an example, the data validation engine may identify the tail numbers of aircraft at the particular airport and confirm that MRD data for the engines of an aircraft with that tail number exists for a flight to that airport.

It should be appreciated that while specific examples are described herein with respect to an aircraft engine use-case, embodiments of the invention provide the capability for applying such techniques to any of a variety of different asset types, limited only by the configuration of the system model. To this end, an embodiment may allow for specification of arbitrary sets of external data that may be used to configure the data validation engine 204 to retrieve data from the external data source 214. As a particular example, the system model 210 may indicate an address of the external data source (e.g., an Internet Protocol address and port number), the structure of data retrieved from that external data source (e.g., names of each column of the data or information about a JavaScript Object Notation format of the external data source), and instructions for using that external data source to identify inconsistent records (e.g., MRD for each flight indicated in a set of flight records should be present within the raw data). These structures may be manually configurable by a user to author the system model 210 which is subsequently ingested by the data validation engine 204. Particular examples of employing a system model to identify inconsistent records are described further below with respect to FIGS. 3-4.

The data validation engine 204 identifies a set of inconsistent data 212. The inconsistent data 212 may include both records that are flagged as suspect (e.g., a four-engine aircraft having MRD data for five engines for the same flight) or missing (e.g., a flight indicated by external airport data with no associated MRD data for the engines). The inconsistent data 212 may include an indication of the particular assets for which data is missing or suspect. The inconsistent data 212 is provided to a data imputation/estimation engine 206 for correction.

The data imputation/estimation engine 206 is also configurable by the system model 210. The data imputation/estimation engine 206 functions to reconcile the inconsistent data 212 by a process configured by the system model 210 and, in some instances, through the use of external data 214. A detailed example of the process by which a data imputation/estimation engine 206 may operate is described further below with respect to FIGS. 3-4 and 6. As a result of the operations of the data imputation/estimation engine 206, a set of consistent data 216 is generated. The set of consistent data 216 may include data generated by one or more analytics for a particular asset that is otherwise lacking a data record (e.g., a digital twin of that asset) or data associated with an asset identified as being similar to the asset with missing data (e.g., another engine on the same plane on the same flight for which data is missing).

In some embodiments, the set of consistent data 216 generated by the data imputation/estimation engine 206 may be returned to the data validation engine 204 for further validation prior to output. In this manner, the data reconciliation framework 202 may review imputed and/or estimated records as configured by the system model 210 in the same or a similar manner to how the raw core data 208 was originally validated, to ensure that the newly added records are properly consistent with the other existing records. In such a review process, these newly added records may be flagged for extra review or exclusion from certain validation processes by the data validation engine 204, to ensure that any newly added estimated records are not used to exclude records that otherwise appear to be valid (e.g., excluding a likely valid record based on it being inconsistent with a newly added estimated record).

Embodiment of a Data Imputation/Estimation Engine

Figure 3:
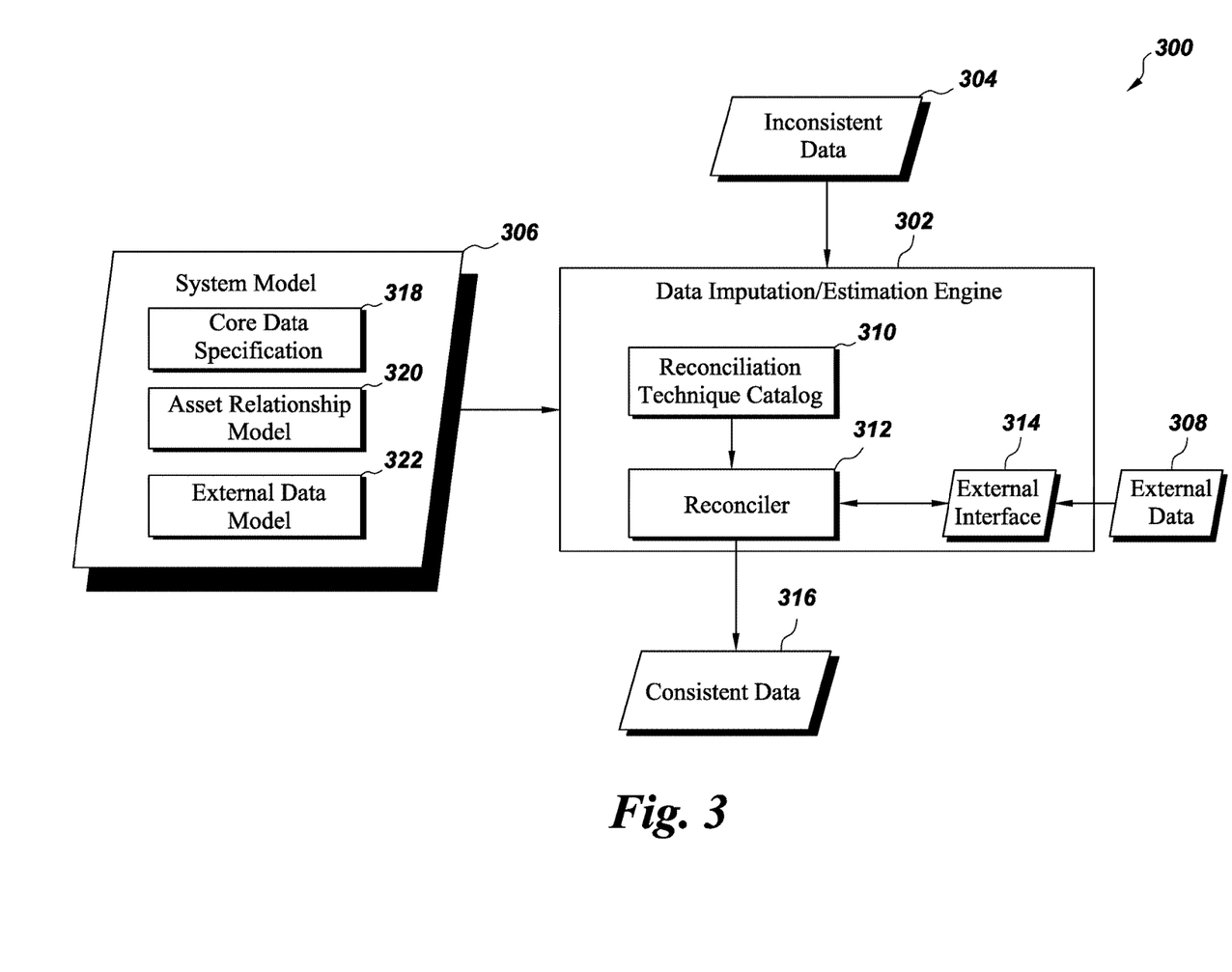
FIG. 3 depicts a detailed illustration of a data reconciliation engine in accordance with some embodiments.

FIG. 3 illustrates an example of logical interactions 300 occurring with respect to and within a data imputation/estimation engine 302 in accordance with some embodiments. The data imputation/estimation engine 302 may, as described above with respect to FIG. 2, serve to correct or fill in gaps in a set of inconsistent data 304. In this example, the functions of the data imputation/estimation engine 302 include both identification of inconsistent records and correction of those inconsistencies, and as such in this example the data imputation/estimation engine 302 may fulfill the functions of both the data validation engine 204 and the data imputation/estimation engine 206 described above with respect to FIG. 2. To perform these functions, the data imputation/estimation engine 302 is programmed by a system model 306. The system model 306 includes specification of a set of core data 318, an asset relationship model 320, and an external data model 322.

The core data specification 318 includes information about the form and structure of the core data which is being reconciled by the data imputation/estimation engine 302. This core data specification 318 may include data, such as markup language data or a JSON object, that indicates the type of data values for each field of the core data. The core data specification 318 may also include certain metadata about the asset type to which the core data pertains, such as whether the core data is associated with an engine, a turbine, a locomotive, a magnetic resonance imaging device, or any other type of asset. This metadata also includes heuristics and asset context data about the core data and underlying assets. For example, this asset context data may take the form of a set of rules for validating and verifying the correctness and completeness of sets of core data. In some embodiments, these rules may have a priority or hierarchical function, where some rules are given precedence over others. Example embodiments for employing such rules are described further below. It should be appreciated that, with the core data specification 318, these rules relate to characteristics of the assets themselves. For example, in the case of aircraft engines, these rules define constraints and heuristics for engine data, not the aircraft upon which the engines are mounted. Such relationship-based constraints are encapsulated within the asset relationship model 320. The core data specification 318 may also indicate the base record type of the data. In the case of aircraft engines, this base record type may be a particular flight phase.

The asset relationship model 320 includes data that indicates how assets are organized within the system to which the system model 306 pertains. This specification provides data that indicates how assets are used together and valid organizations of those assets. For example, in the case of an aircraft engine, the asset relationship model 320 may indicate that engines are mounted on particular planes for particular flights, that flights have particular phases, that phases are organized together to create a flight, that engines on the same aircraft travel on the same flights as one another, and that aircraft are associated with particular flights from a first location to a second location. In this manner, the asset relationship model 320 can be considered as a schema for organizing the core data into a model that is capable of detecting when records are missing or inconsistent and filling in those records. For example, if the asset relationship model indicates that a "flight" structure has 5 associated phases, but records for an engine for a particular flight only exist for 4 phases, then it can be assumed that at least one phase is missing. Similarly, if an external data source 308 indicates that a flight has occurred for a given aircraft tail number, but no data exists in the core data for any engines associated with that tail number for that flight, then it can be assumed that data for those engines is missing.

The asset relationship model 320 may further specify one or more of a series of techniques for imputing or estimating elements of the core data based on elements of the asset relationship model 320. For example, the asset relationship model 320 may include instructions for selecting particular analytic or estimation techniques based on a particular element of the asset relationship model being known. As a specific example, a missing flight element of the asset relationship model may have associated core data estimated through the use of a predictive model associated with an engine associated with the missing flight. This predictive model may also include data ingested from various additional external sources, such as a data source for environmental conditions and the like.

The asset relationship model 320 may also include high level information about the "ecosystem" in which assets operate, including but not limited to system level heuristics. In this regard, the asset relationship model 320 may also specify certain heuristics for data analysis of assets in the relationship model. For example, a heuristic for flights may indicate that an aircraft should have a flight record for each transition indicated between airports by airport data. If an aircraft is determined to be at two different airports (e.g., by a tail number of the aircraft being included in a set of airport data received from an external data source), and the core data does not indicate a flight between those two airports occurred, then the heuristic may indicate a missing data record. Various additional or alternative heuristics may be specified within the asset relationship model 320 in this manner.

The external data model 322 provides a model for retrieving data from external data sources 308. The external data model 322 includes information on the form and structure of an external data source 308 such that the external data source 308 can be queried to retrieve the associated data. For example, the external data model 322 may include data indicating an address of the external data source, the fields of the external data source, and which elements of the asset relationship model 320 are associated with the data provided by the external data source. For example, where the asset relationship model 320 includes a structure for an aircraft flight, the external data model 322 may include an entry for an airport database that lists all flights by tail number that flew to that airport. The external data model 322 may further indicate either an appropriate query format to query the airport database for the tail numbers, or the particular field of a set of returned data to identify the tail numbers.

The data imputation/estimation engine 302 may receive the system model 306 and the inconsistent data 302 for the purpose of reconciling the inconsistent data. To this end, the data imputation/estimation engine 302 includes a reconciler 312 and an external interface 314 that are configured by the received system model 306. The reconciler 312 receives the system model 306 and applies the asset relationship model 320 to the inconsistent data 304 to identify missing and inconsistent data records according to the constraints imposed by the system model 306.

The reconciler 312 may access a catalog of reconciliation techniques 310. This reconciliation technique catalog 310 includes a plurality of techniques for restoring data identified as missing upon analysis of the inconsistent data 304. The particular selected techniques and configuration of those techniques may be performed in accordance with the techniques specified by the system model 306. In this manner, the reconciler 312 is configured by the system model 306 to select and implement particular data imputation techniques to restore missing or inconsistent records from the inconsistent data 304.

The reconciler 312 also communicates with an external interface 314 to access one or more external datastores 308. The reconciler 312 may use the external interface 314 to identify data records indicated by the external data model 322 included within the system model 306. The reconciler 312 may retrieve the external data indicated within the system model 306 via the external interface 314, and use that retrieved data to both identify inconsistent records within the inconsistent data 304 and to correct those records by imputation or estimation. The corrected records are output by the reconciler as a set of consistent data 316. An example implementation of identifying missing records, receiving external data, and generating a set of consistent data 316 is described further below with respect to FIG. 4.

Example Data Flow Implementing a Data Reconciliation Framework

Figure 4:
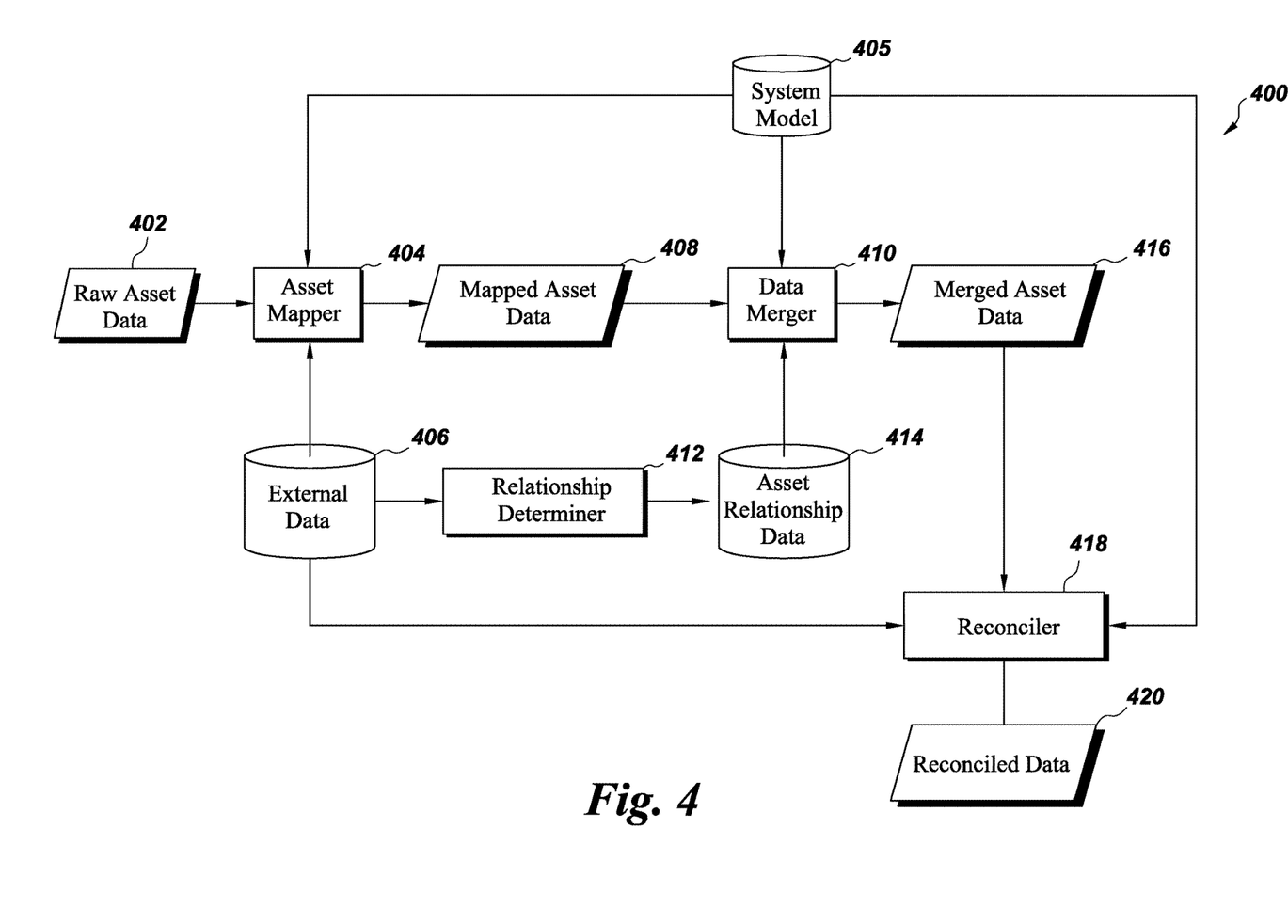
FIG. 4 depicts an illustration of a data flow of asset data throughout a data reconciliation process in accordance with some embodiments.

The systems and frameworks illustrated in FIGS. 1-3 describe various logical and physical components for implementing a data reconciliation framework. FIG. 4 illustrates an example reconciliation data flow 400 for aircraft engine data that may be implemented by such a framework as programmed by a particular system model. The data flow 400 describes how the programmed data reconciliation framework 400 maps aircraft engine data to components of a system model, identifies missing data through the use of external data and asset relationship data, and restores or estimates the missing data.

The data flow 400 begins with the receipt of raw asset data 402. The raw asset data 402 may, for example, be RMD data indexed by engine serial number. The raw asset data 402 is processed by a mapper 404 which receives flight data from a set of external data 406. For example, the set of external data 406 may include airport data indicating which flights at particular airports and the aircraft tail numbers at each airport. The mapper 404 may ensure that each flight has associated RMD data from the raw asset data 402. The mapper 404 may generate mapped asset data 408, which includes a list of flights and the associated raw asset data 402 to which each flight maps. Using such a data structure, the framework can identify which flights are missing data or appear to have inaccurate data (e.g., data for five engines for a single flight completed by a four-engine aircraft). The mapper 404 may be configured to perform these functions by a system model 405, which indicates the particular relationships between flights and sets of engine data.

The mapper 404 may also determine the presence of missing or inconsistent data through the use of heuristic techniques specified by the system model 405. For example, in the specific case of aircraft engines, if a flight for a given aircraft tail number exists between two points, Point A and Point B, and a flight for the same aircraft exists between Point C and Point D, then it can be imputed that at least one flight is missing to get the aircraft from Point B to Point C. The system model 405 may, for example, configure the mapper 404 to generate a transition matrix that identifies each source and destination for each flight, and determines when gaps exist for particular aircraft tail numbers.

The framework may also make use of relationships between assets to perform data imputation for missing records. The mapped asset data 408 maps the particular records within the raw asset data 402 to individual flights. A relationship determiner 412 may utilize the external data 406 to generate a set of relationships between assets as a set of asset relationship data 414. In the case of aircraft engines, the asset relationship data 414 may indicate which aircraft engines were associated with particular aircraft tail numbers at particular time intervals. This information may be determined based on an external data source 406 that indicates when engines were added or removed to particular aircraft, or the intervals for particular engines on particular aircraft may be inferred from the set of raw asset data 402 or the set of mapped asset data 408 by noting which engines are mapped to shared flights.

A data merger 410 may be configured by the system model 405 to merge data across assets based on the asset relationship data 414. The system model 405 may indicate the particular rules or criteria for determining when a valid relationship exists between assets such that data from one asset can be used to substitute for missing or inconsistent data for a related asset. For example, in the case of aircraft engines, if a data record for a particular flight for a particular engine is missing, the system model 405 may configure the data merger 410 to identify a sister engine from the same flight and add a record for the missing engine that uses the same or similar data as the sister engine. The set of data including records imputed from related assets is output by the data merger 410 as a set of merged asset data 416.

The merged asset data 416 is provided to a reconciler 418 to complete the process of imputing and estimating data for missing and inconsistent records. The reconciler 418 is configured by the system model 405 to perform data reconciliation functions for data records that are still missing after merging the related data by the merger 410 to create the merged asset data 416.

The reconciler 416 may employ a variety of techniques to estimate or impute missing data. For example, if a flight is indicated by the external data 406 and identified as missing associated data records by the asset mapper 404, then the reconciler may employ various analytics and predictive models to estimate the missing information. For example, the reconciler 416 may include a catalog of imputation techniques that are configured by the system model 405. Particular analytics and predictive models for engine RMD data may be included in the catalog that receive a source and a destination of a flight and generate corresponding RMD data. Such analytics and predictive models may also ingest other data, such as local environmental data at a location, historical data for a particular engine, and the like. In some embodiments, specific engine serial numbers may be associated with particular analytics, such as where a digital twin of that engine exists for estimating its particular performance characteristics. In this manner, the reconciler 418 may select appropriate analytic techniques to fill in any remaining missing records to generate a set of reconciled data 420.

In some embodiments, the reconciler 418 may also perform or initiate validation of the reconciled data 420. For example, the reconciler 418 may provide the reconciled data 420 to a validation engine to confirm that newly reconciled records are consistent with the other core data. In this regard, embodiments may repeat the validation and reconciliation process multiple times to ensure the output of entirely consistent data.

Example Illustration of System Model Populated with Data

Figure 5:
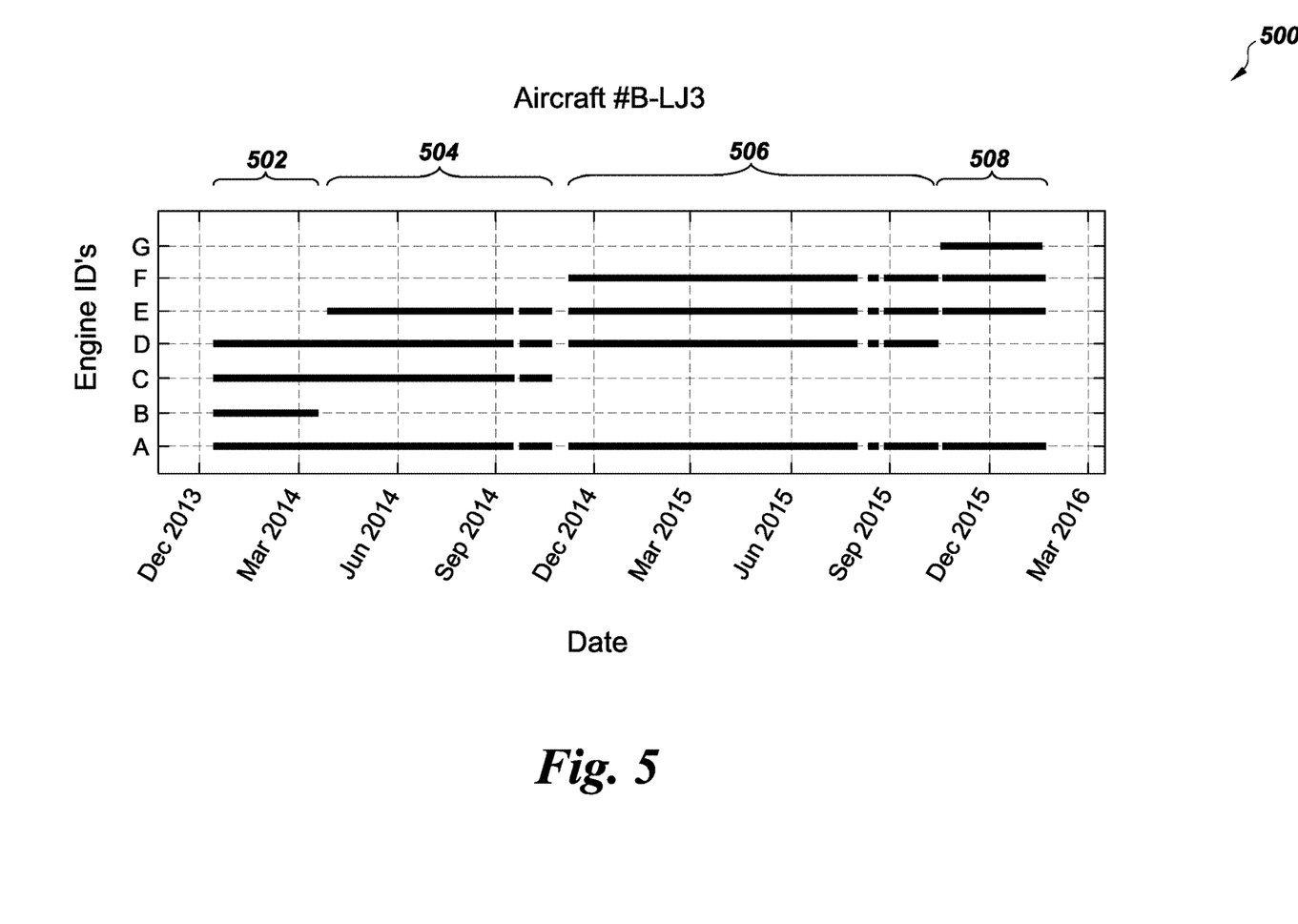
FIG. 5 depicts an illustration of a system model used to organize core data and external data in accordance with some embodiments.

FIG. 5 illustrates an example of an organized set of data 500 generated from a set of core data and external data using a system model and a data reconciliation framework in accordance with some embodiments. The set of data 500 is organized in a table reflecting flight data for a set of engines A-G which at one point or another were mounted on an aircraft with a tail number B-LJ3. As presented herein, the table is tied to the aircraft number, and it should be understood that an exemplary set of organized data may include a plurality of tables, each associated with a particular aircraft tail identifier. A given engine may appear on multiple tables if that engine was mounted on different aircraft at different times.

As depicted in the table, the aircraft B-LJ3 is a four-engine aircraft. Such a definition would typically be included in a system model associated with the engines, such as a data table specifying the types of aircraft associated with that engine and the engine configuration of each type of aircraft (e.g., number of engines). Upon ingesting the core data, the data reconciliation framework may establish a data structure or table for each aircraft tail number identified within the core data, and begin attaching engines to those aircraft at particular times. The system model associated with the engine data may further include asset and system context data for applying those engines to particular aircraft at particular times, such as by identifying time intervals when data exists showing that engine in flight on that aircraft. As the core data is processed, each record is added to a set of organized data such as the set of organized data 500.

By examining the set of organized data 500, a set of intervals can be determined representing the different times different engines were mounted on particular aircraft. In the present example, for a first interval 502, engines A, B, C, and D were mounted on the aircraft. A second interval 504 begins when engine B was removed and engine E mounted on the aircraft. A third interval 506 begins when engine C was removed and engine F was mounted on the aircraft, and a fourth interval 508 begins when engine D was removed and engine G mounted on the aircraft.

Once the engine data is organized into intervals, this organized data can be examined using heuristics and validation techniques to identify incomplete data sets and inconsistencies. For example, in the present system model, an aircraft with an interval including only three engines can be identified as an inconsistency, or an aircraft with more than four engines at a given interval would be an inconsistency. Upon identification of an inconsistency, various techniques as described above may be employed to correct these errors.

It should be appreciated that the data reconciliation framework is capable of employing a variety of different techniques for organizing data, and that the interval-based technique for aircraft engine data described herein is just one example of the manner in which such a framework may be employed. Other systems may be organized in different manners and such systems would have attendant system models to configure the framework based on those organizations. To this end, system models may be provided according to a predefined set of data structures or authoring languages as described above.

Figure 6:
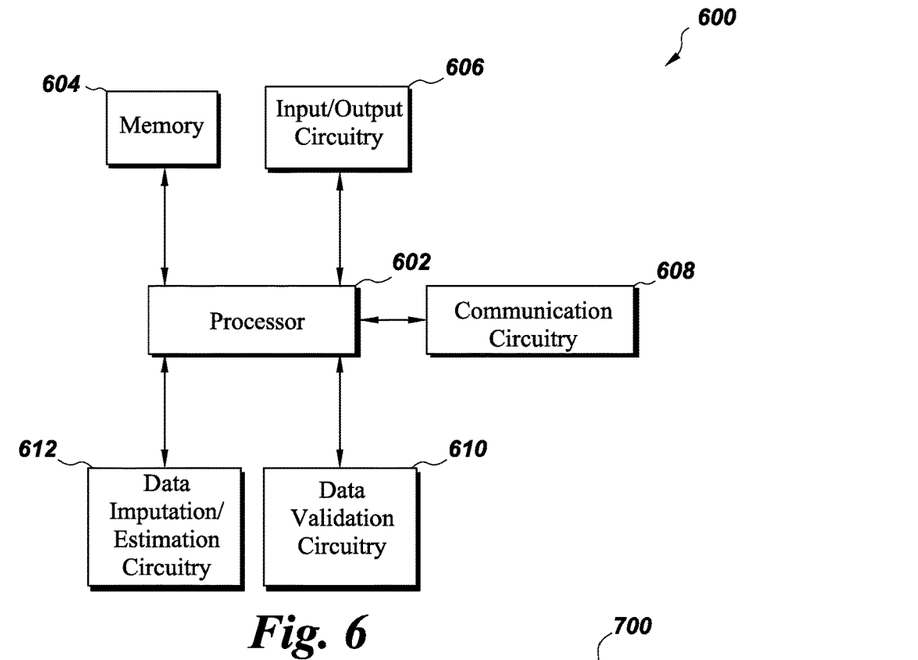
FIG. 6 depicts an example of computer hardware for implementing a data reconciliation framework in accordance with some embodiments.

The various components of the systems described in FIGS. 1-4 may be implemented by one or more computing nodes having specially programmed hardware and software. FIG. 6 illustrates an example of such hardware for implementing a data reconciliation framework as described above with respect to FIGS. 1-5. While the instant example 600 is described with respect to a computing node, it should be readily appreciated that embodiments may be implemented across multiple computing nodes having various distributions of tasks and functions.

Example Computer Hardware for Implementing a Data Reconciliation Framework

The various components of the systems described in FIGS. 1-4 may be implemented by one or more computing nodes having specially programmed hardware and software. FIG. 6 illustrates an example of such hardware for implementing a data reconciliation framework as described above with respect to FIGS. 1-5. While the instant example 600 is described with respect to a computing node, it should be readily appreciated that embodiments may be implemented across multiple computing nodes having various distributions of tasks and functions.

The computing device 600 may be any computing device operable for implementing aspects of the system described above with respect to FIGS. 1-4. In this regard, the computing device may be, for example, a server, a personal computer, an additive manufacturing device controller, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device. It should also be appreciated that the computing device may comprise multiple such devices in a linked or networked architecture. For example, a graphical user interface may be provided by a "thin client" capable of execution on a mobile device, with server functions provided by a desktop or server computer.

The computing device 600 of the illustrated example includes a processor 602. The processor 602 of the illustrated example is hardware, and may be implemented by one or more integrated circuits, logic circuits, microprocessors or controllers from any desired family or manufacturer. In the illustrated example, the processor 602 is structured in communication with a memory 604, input/output circuitry 606, communication circuitry 608, data validation circuitry 610 and data imputation/estimation circuitry 612.

Although the elements of the computing device 600 are described as discrete components, it should be appreciated that the components 602-612 may overlap in hardware and functionality. For example, elements of the data validation circuitry 610 may incorporate or overlap with elements of the processor 602, the communication circuitry 608, the memory 604, and the like. In some embodiments, the functionality of certain elements of the computing device 600 may be subsumed or covered completely by other elements of the device, such as in cases where an element of the computing device 600 is implemented via programmed hardware provided by another component of the computing device 600 (e.g., the processor 602 programmed by one or more algorithms stored in the memory 604).

The memory 604 may encompass any number of volatile and non-volatile storage devices, including but not limited to cache memory of the processor, system memory, mechanical or solid-state hard disk storage, network accessible storage (NAS) devices, redundant array of independent disk (RAID) arrays, or the like. Access to the memory 604 may be provided by one or more memory controllers implemented as hardware of the processor 602 and/or memory 604. The memory 604 may store instructions for programming the processor 602 to perform the various algorithms and functions for implementing embodiments as described herein.

The computing device 600 also includes an input/output circuitry 606. The input/output circuitry 606 may be implemented by any type of interface standard, such as an Ethernet interface, a universal serial bus (USB), and/or a PCI express interface. The input/output circuitry 606 may provide for communication with one or more input devices that permit a user to enter data and commands to the computing device 600 and one or more output devices for enabling audible and visual components of a graphical user interface. For example, the input/output circuitry 606 may provide data interfaces for displaying an interface via a monitor and receiving inputs from a keyboard, mouse, touchscreen, or the like. The input/output circuitry 606 may enable a user to enter data and commands that are received by the processor 602 to perform various functions. As further examples, the input/output circuitry 606 may enable input via an audio sensor, a microphone, a camera (still or video), a keyboard, a button, a mouse, a touchscreen, a track-pad, a trackball, isopoint, a gesture input system, and/or a voice recognition system. Examples of output devices enabled by the input/output circuitry 606 include, but are not limited to display devices (e.g., a light emitting diode (LED), an organic light emitting diode (OLED), a liquid crystal display, a cathode ray tube display (CRT), a touchscreen, a tactile output device, a printer and/or speakers).

The communication circuitry 608 includes one or more communication devices such as a transmitter, a receiver, a transceiver, a modem and/or network interface card configured to facilitate exchange of data with external machines (e.g., computing devices of any kind, including but not limited to the various layers of the data access framework 100 described above with respect to FIG. 1) via a network (e.g., an Ethernet connection, a digital subscriber line (DSL), a telephone line, coaxial cable, a cellular telephone system, etc.).

The data validation circuitry 610 includes hardware configured to process a set of core data and apply a system model to determine whether and where records are missing from the set of core data. Identification of missing records may be performed by analyzing the core data for internal consistency (e.g., applying heuristics indicated in a system model to a set of received core data) and for consistency with external data sources (e.g., reviewing external records to identify records that should be present within the set of core data, but which are not). To this end, the data validation circuitry 610 may leverage processing circuitry, such as the processor 602 that is programmed by one or more sets of instructions to implement algorithms for identifying inconsistent records. These instructions may include, for example, a system model used to configure the data validation circuitry 610. This system model may be stored in the memory 604.

The data imputation/estimation circuitry 612 includes hardware configured to reconstruct records that are identified as missing or inconsistent by the data validation circuitry 610. Reconstruction of missing records may be performed by a process configured by a system model as described above with respect to FIGS. 1-4. In this manner, the data imputation/estimation circuitry 612 may leverage processing circuitry, such as the processor 602, that is programmed by one or more sets of instructions to implement algorithms for imputing or estimating data for missing or inconsistent records. These instructions may include, for example, a system model used to configure the data imputation/estimation circuitry 612. This system model may be stored in the memory 604.

Examples of Processes for Implementing a Data Reconciliation Framework

Figure 7:
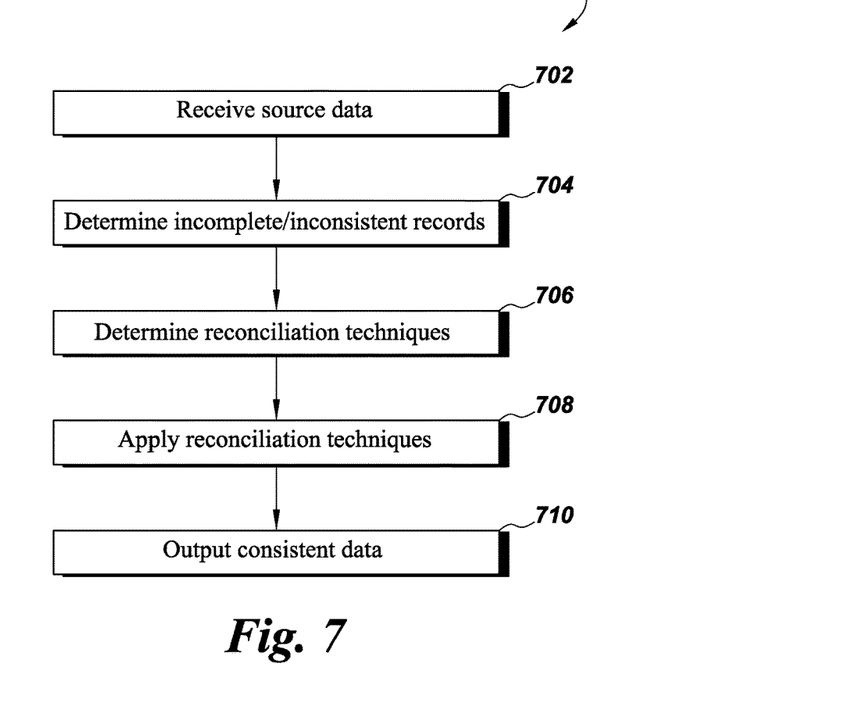
FIG. 7 depicts an example of a process for performing data reconciliation using a data reconciliation framework in accordance with some embodiments.

FIG. 7 illustrates an example of a process 700 for implementing data reconciliation functions using a data reconciliation framework in accordance with some embodiments. The process may be implemented by a data reconciliation framework 102 as described above with respect to FIGS. 1-4. Embodiments may also be implemented utilizing computer hardware such as the computer system hardware 600 described with respect to FIG. 6. The process 700 illustrates a mechanism for employing a data reconciliation framework to detect incomplete or inconsistent data records in a set of core data and correct or fill in those records using data imputation and estimation techniques.

The process 700 begins at action 702, where a set of source core data is received. As described above, the core data may be a set of data records to be processed to identify missing or incomplete records and to fill in those missing or incomplete records.

At action 704, the process 700 identifies missing, incomplete, or inconsistent records. Identification of these records may be performed by various components of the framework, such as a data validation engine and/or data imputation/estimation engine as described above with respect to FIGS. 1-3. Configuration of this aspect of the process may occur based upon a system model that indicates relationships between the various assets and the core data. Examples of a process for using a system model in this manner are also described above with respect to FIGS. 1-3.

At action 706, reconciliation techniques are determined for the missing, inconsistent, or incomplete records identified at action 704. The reconciliation techniques may be selected from a catalog of techniques as described above with respect to FIGS. 2-3. These techniques may be configured or selected based on a system model, which identifies the particular reconciliation techniques and associated internal data and external data sources for use in the reconciliation process.

At action 708, the reconciliation techniques are applied to the source core data. The reconciliation techniques may be configured and executed according to the system model as described above with respect to FIGS. 2-3. Reconciliation of the source core data includes adding missing records identified at action 704 and replacing or amending inconsistent or incomplete records. At action 710, the reconciled records are output. Output of the records may include storing the reconciled records in a datastore for use by a predictive model or analytic, executing an analytic against those records, employing those records in a machine learning training model, transmitting those records to a client device or end user, or the like.

Figure 8:
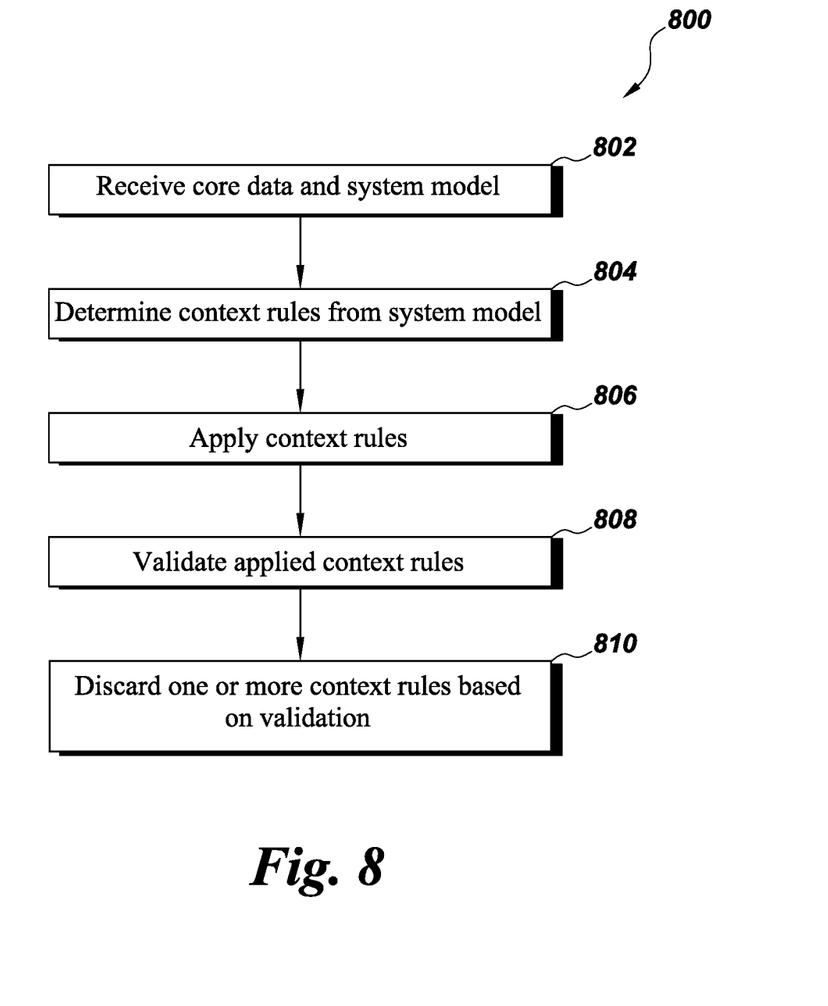
FIG. 8 depicts an example of a process for employing a system model comprising context data to validate core data in accordance with some embodiments.

FIG. 8 illustrates a flow diagram of an example of a process 800 for applying a set of context data to a set of core data in an intelligent manner. It should be understood that occasionally data records which appear to be in conflict with one another may actually be valid or consistent. For example, while records that indicate an aircraft engine landed at one airport and then took off from a different airport may appear to be erroneous, such a use case is possible when the engine was unmounted from at the first airport for maintenance and then transported via auto or rail to the second airport. Recognizing that sometimes a given set of core data may not be entirely consistent, embodiments provide a mechanism for prioritizing different rules associated with context data and accepting or discarding the results of those rules accordingly. This process 800 may be implemented by a data reconciliation framework as described above, executing on computing hardware such as the system 600 described with respect to FIG. 6.

The process 800 begins at action 802, where a set of core data and a system model associated with that core data are received. At action 804, a set of context rules are determined from the system model. These context rules are based upon any asset context data and system context data defined within the system model, to be used for validating the set of core data. These context rules may include a clearly defined priority (e.g., where an author of the system model has indicated a priority), or a priority may be inferred by the process as described below. The context rules may be explicitly indicated (e.g., criteria A, B, and C must be true for each asset), or implicitly indicated (e.g., each asset has these characteristics), and inferred from the asset definitions.

At action 806, the context rules are applied to the set of core data 806. Application of the context rules may be performed against each record individually, the records as a whole, or the records in view of a set of external data as described above with respect to FIGS. 1-7. Application of the context rules results in a set of records that have been analyzed in view of each context, with certain records or groups of records flagged as inconsistent, invalid, or missing.

At action 808, each set of records resulting from the applied context results is reviewed and validated. Validation may include determining which records were indicated as invalid, incomplete, or inconsistent by each context.

At action 810, a determination is made as to which context applications to keep and which context applications to discard. For example, a first context rule may indicate a first record is valid, and that valid record may serve as a basis for finding several other records as invalid, and a second context rule may find that first record to be invalid, and the several of the other records to be valid. The process 800 may make a determination as to which records to find invalid based on various techniques. For example, the context rules may be associated with clearly defined prioritization techniques, such that a context rule with higher priority always "wins" if there is a discrepancy. Alternatively, the process 800 may attempt to determine which context rule results in the fewest inconsistent, incomplete, or invalid records, and select that context and discard context rules that disagree. As another alternative, the process 800 may identify a grouping of context rules that are in the greatest agreement (e.g., have the least number of records identified as invalid or inconsistent between the applications of each context rule), and identify those context rules as valid and discard the rest. In this manner, embodiments are capable of not only identifying particular records as inconsistent or invalid, but also capable of identifying context rules that are "most" helpful for evaluating a set of records for inconsistencies. In some embodiments, various machine learning algorithms and automated techniques may be employed to assist with these functions such that the process 800 is trained over time to select the best context rules by users reviewing the output and indicating where the system failed to spot inconsistencies. As a result, embodiments provide a flexible, robust mechanism for identifying incomplete or inconsistent records to for use a data reconciliation framework.

Although specific hardware and data configurations have been described herein, note that any number of other configurations may be provided in accordance with embodiments of the present invention (e.g., some of the information associated with the databases described herein may be combined or stored in external systems). For example, although some embodiments described herein relate to assets employed in an industrial context, any of the embodiments described herein could be applied to other types of systems and assets.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computer system implementing a data reconciliation framework, the computer system configured to:
    receive core data, the core data comprising a plurality of data records associated with at least two assets;
    receive a system model, the system model comprising context data indicating at least one characteristic of the at least two assets;
    execute a configuration operation of a data validation process based on the system model, wherein the configuration operation comprises selecting at least one heuristic included in the system model, the selection based on the at least one characteristic;
    execute the data validation process to identify at least one missing, inconsistent, or incomplete record among the plurality of data records;
    determine at least one data reconciliation technique from a plurality of data reconciliation techniques based on the system model; and
    generate a consistent data set by applying the at least one data reconciliation technique to the core data to impute the at least one missing data record or remove the at least one inconsistent or the at least one incomplete record.

2. The computer system of claim 1, wherein:
    the core data comprises repair maintenance data (RMD) for a plurality of aircraft engines, wherein the system model comprises information identifying a relationship between the plurality of aircraft engines, one or more flights, and one or more aircraft, and wherein the data validation process identifies the at least one inconsistent or incomplete record based on determining that the core data is missing at least one entry for at least one of the one or more flights.

3. The computer system of claim 1, wherein the system model further comprises data configuring at least one external data access process, and wherein the data validation process further comprises retrieving external data from at least one external datastore according to the data configuring the at least one external data access process.

4. The computer system of claim 3, further configured to determine whether at least one of the plurality of data records corresponds to the external data from the at least one external datastore as part of the data validation process.

5. The computer system of claim 4, wherein the external data is airport flight information.

6. The computer system of claim 1, wherein the context data comprises system context data, and wherein the at least one characteristic indicates a grouping of assets among the plurality of assets.

7. The computer system of claim 6, wherein the grouping indicates a hierarchical relationship.

8. The computer system of claim 7, wherein the grouping is a grouping by aircraft and wherein the assets are aircraft engines.

9. The computer system of claim 1, wherein the context data comprises asset context data, and wherein the at least one characteristic is associated with a particular asset type of the at least two assets.

10. A method for implementing a data reconciliation framework, the method comprising:
    receiving core data, the core data comprising a plurality of data records associated with at least two assets;
    receiving a system model, the system model comprising context data indicating at least one characteristic of the at least two assets;
    executing a configuration operation of a data validation process based on the system model, wherein the configuration operation comprises selecting at least one heuristic included in the system model, the selection based on the at least one characteristic;
    executing the data validation process to identify at least one missing, inconsistent, or incomplete record among the plurality of data records;
    determining at least one data reconciliation technique from a plurality of data reconciliation techniques based on the system model; and
    generating a consistent data set by applying the at least one data reconciliation technique to the core data to impute the at least one missing data record or remove the at least one inconsistent or the at least one incomplete record.

11. The method of claim 10, wherein:
the core data comprises repair maintenance data (RMD) for a plurality of aircraft engines, wherein the system model comprises information identifying a relationship between the plurality of aircraft engines, one or more flights, and one or more aircraft, and wherein the data validation process identifies the at least one inconsistent or incomplete record based on determining that the core data is missing at least one entry for at least one of the one or more flights.

12. The method of claim 10, wherein the system model further comprises data configuring at least one external data access process, and wherein the data validation process further comprises retrieving external data from at least one external datastore according to the data configuring the at least one external data access process.

13. The method of claim 12, further comprising determining whether at least one of the plurality of data records corresponds to the external data from the at least one external datastore as part of the data validation process.

14. The method of claim 13, wherein the external data is airport flight information.

15. The method of claim 10, wherein the context data comprises system context data, and wherein the at least one characteristic indicates a grouping of assets among the plurality of assets.

16. The method of claim 15, wherein the grouping indicates a hierarchical relationship.

17. The method of claim 16, wherein the grouping is a grouping by aircraft and wherein the assets are aircraft engines.

18. The method of claim 10, wherein the context data comprises asset context data, and wherein the at least one characteristic is associated with a particular asset type of the at least two assets.

19. A non-transitory computer readable storage medium comprising program instructions for implementing a data reconciliation framework, the instructions, when executed by a processor, cause the processor to:
receive core data, the core data comprising a plurality of data records associated with at least two assets;
receive a system model, the system model comprising context data indicating at least one characteristic of the at least two assets;
execute a configuration operation of a data validation process based on the system model, wherein the configuration operation comprises selecting at least one heuristic included in the system model, the selection based on the at least one characteristic;
execute the data validation process to identify at least one missing, inconsistent, or incomplete record among the plurality of data records;
determine at least one data reconciliation technique from a plurality of data reconciliation techniques based on the system model; and
generate a consistent data set by applying the at least one data reconciliation technique to the core data to impute the at least one missing data record or remove the at least one inconsistent or the at least one incomplete record.

20. The computer readable storage medium of claim 19, wherein:
the core data comprises repair maintenance data (RMD) for a plurality of aircraft engines, wherein the system model comprises information identifying a relationship between the plurality of aircraft engines, one or more flights, and one or more aircraft, and wherein the data validation process identifies the at least one inconsistent or incomplete record based on determining that the core data is missing at least one entry for at least one of the one or more flights.

\* \* \* \* \*